United States Patent [19]

Grünbichler

[11] Patent Number: 5,713,705
[45] Date of Patent: Feb. 3, 1998

[54] FASTENER BOLT WITH LIMITED TORQUE HEAD

[76] Inventor: Carl Grünbichler, 2851 N. Oakland Forest Dr., Oakland Park, Fla. 33309

[21] Appl. No.: 609,722

[22] Filed: Mar. 1, 1996

[51] Int. Cl.⁶ .............................. F16B 31/00; F16B 41/00
[52] U.S. Cl. ............................... 411/5; 41/410; 41/910
[58] Field of Search .......................... 411/2, 3, 5, 395, 411/410, 910

[56] References Cited

U.S. PATENT DOCUMENTS

| | | |
|---|---|---|
| 2,083,054 | 6/1937 | Cline .............................. 411/5 |
| 3,182,757 | 5/1965 | Reiland . |
| 3,424,212 | 1/1969 | Kemper ........................ 411/410 |
| 3,498,174 | 3/1970 | Schuster ........................ 411/5 |
| 4,021,892 | 5/1977 | Piper . |
| 4,502,825 | 3/1985 | Yamada . |
| 4,819,522 | 4/1989 | Stinson . |
| 4,874,275 | 10/1989 | Gotman .......................... 411/5 |
| 5,120,168 | 6/1992 | Padula . |
| 5,199,834 | 4/1993 | Seidl et al. . |

FOREIGN PATENT DOCUMENTS

| | | | |
|---|---|---|---|
| 2011739 | 9/1971 | Germany ........................... 411/3 |
| 2353751 | 5/1975 | Germany ........................... 411/3 |
| 3738409 | 5/1989 | Germany ........................... 411/5 |
| 1557234 | 12/1979 | United Kingdom ........... 411/2 |

*Primary Examiner*—Flemming Saether
*Attorney, Agent, or Firm*—Herbert L. Lerner; Laurence A. Greenberg; Werner H. Stemer

[57] ABSTRACT

A non-removable, tamper-proof bolt has a threaded shaft, a permanent head, and a torque head which is sheared off from the assembly when the bolt is fastened. The shaft has an opening formed therein at the forward screw end, and the opening has a profile for engagement with a torque tool. The torque head is formed with a hole as well which extends through the entire torque head coaxially with the threaded shaft. The torque head is attached to the permanent head by the intermediary of a bridge defined around said hole in the torque head. Once the torque head is sheared off, the bolt cannot be turned until the opening formed in the forward screw end is exposed by drilling through the shaft from the permanent head inwardly.

13 Claims, 6 Drawing Sheets

FASTENER BOLT WITH LIMITED TORQUE HEAD

BACKGROUND OF THE INVENTION

1. Field of the Invention

The invention relates to an inherently non-removable bolt or screw; the bolt is threaded into an appropriately threaded opening and, once the bolt has reached its intended seating, the bolt head breaks off. The bolt can no longer be removed.

2. Description of the Related Art

Non-removable bolts are conventionally used in the theft and vandalism protection context. Quite well-known, for instance, are the typically used screw heads in public restrooms and the like. Such screw heads are provided with one-way slits, i.e. ridges which allow a slot-type screwdriver to turn the screw clockwise but not counter-clockwise. A more elaborate system is disclosed in U.S. Pat. No. 4,502,825 to Yamada. The screw shown therein is provided with multiple heads which shear off from the screw body when a certain rated torque is applied. The last bolt head, which remains on the bolt after all of the removable heads have been sheared off, is made difficult to access. A relatively complicated, specific tool is required to remove the properly installed bolt. U.S. Pat. No 5,120,168 to Padula discloses an auto-torque screw bolt in which a first head is sheared off when a predetermined torque is exceeded. A further head is formed without any profile which would allow a tool to engage the head so that the screw could be removed. The head is instead conically tapered so as to further prevent engagement with a clamping tool, such as pliers. The Padula bolt can be removed only by drilling with a locking counter drill or by otherwise destroying the bolt. If the bolt were formed of plastic then it would be possible to form engagement structure in the further head, for instance by heat melting. The bolt could then be quite easily removed. In the case of screws with low torque shear limit, the joining bridge between the torque head and the permanent head is quite small. There exists the possibility that the torque head is pushed sideways and the torque head breaks off without reaching its rated torque limit. In that case, the screw is not correctly seated and it can no longer be removed.

Related information may be found in U.S. Pat. No. 5,199,834 to Seidl et al., U.S. Pat. No. 4,819,522 to Stinson, and U.S. Pat. No. 3,812,757 to Reiland. All of the prior art disclosures have in common that the removing head either remains on the bolt, albeit in a position where it is difficult to access, or the bolt must be entirely destroyed for removal. The torque heads of the prior art structure are also susceptible to side shear and breakage before the intended limit torque has been attained.

SUMMARY OF THE INVENTION

It is accordingly an object of the invention to provide a fastener bolt with limited torque head, which overcomes the above-mentioned disadvantages of the heretofore-known devices and methods of this general type and which provides an essentially non-removable bolt whose removal profile is properly hidden and non-accessible, and whose torque head is strengthened in terms of its susceptibility to side shear which could lead to premature severing of the structure.

With the foregoing and other objects in view there is provided, in accordance with the invention, a tamper-proof bolt, comprising:

a threaded shaft with a first end and a second end, the shaft defining a longitudinal bolt axis;

a permanent clamping head formed on the first end of the threaded shaft;

the threaded shaft having an opening formed therein at the second end thereof, the opening extending along the axis and being formed with a profile for engagement with a torque tool; and a torque head formed on the permanent clamping head, the torque head having a hole formed therein, the hole extending through the entire torque head coaxially with the threaded shaft and with the opening in the second end of the shaft;

the torque head being attached to the permanent head by the intermediary of a bridge defined around the hole in the torque head.

In accordance with an added feature of the invention, the torque head has a circumferential outer profile, such as a hexagonal profile, for engagement by a torque tool such as a wrench. The torque head is preferably formed with an inner profile coaxially surrounding the hole for engagement by a torque tool, such as an Allen wrench. The profile of the opening is also advantageously a hexagonal profile for engagement with an Allen wrench.

In accordance with further features of the invention, the permanent head has an outer circumference which is tapered towards the torque head. In an alternative, counter-sunk embodiment, the permanent head is tapered away from the torque head.

In accordance with again another feature of the invention, the top surface of the permanent head at which the bridge is attached is inwardly tapered towards the bridge.

In accordance with again an added feature of the invention, the top surface of the permanent head has a given diameter and the bridge has a diameter between 50% and 60% of the given diameter. The hole in the torque head has a diameter between 25% and 45% of the diameter of the bridge.

In accordance with a concomitant feature of the invention, the shaft, the permanent head, and the torque head are integrally molded in one piece. The bolt is preferably injection molded.

Other features which are considered as characteristic for the invention are set forth in the appended claims.

Although the invention is illustrated and described herein as embodied in a fastener bolt with limited torque head, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
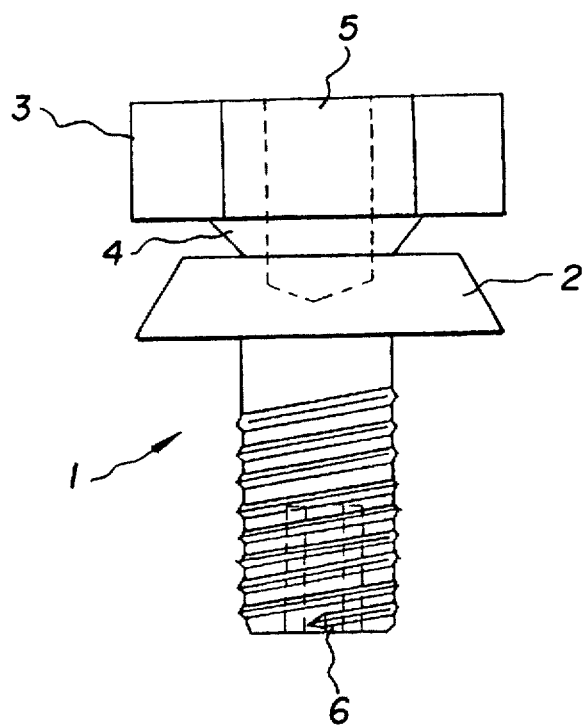
FIG. 1 is a is a diagrammatic side elevation of a bolt according to the invention.
Figure 4:
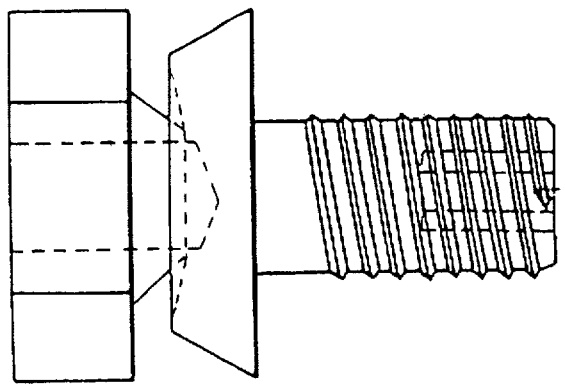
FIGS. 2–8 are similar elevational views of alternative embodiments of the invention.

Referring now to the figures of the drawing in detail and first, particularly, to FIG. 1 thereof, there is seen a bolt which consists essentially of a threaded shaft section 1, a permanent clamping head 2, and a torque head 3. The clamping head 2 and the shaft section 1 together form the non-removable bolt. It is noted that the terms screw and bolt will be used interchangably in the following description.

The torque head 3 is provided with a conventional outer profile at which a torque tool may engage. For instance, the exemplary embodiment herein is shown with a hexagonal head for actuation by a wrench or a ratchet nut. The torque head 3 attaches to the permanent head 2 through a bridge 4 and it has a circular hole 5 formed therein which travels coaxially through the entire torque head 3, and slightly (approximately 2 mm) into the permanent head 2. The diameter of the hole 5, together with the smallest outer diameter of the bridge 4, defines a upper limit torque necessary to shear off the torque head 3. In manufacture, therefore, the outer mold of the bridge will not usually be varied. The insertion core for the hole 5, however, can be readily varied and a wide array of differently rated bolts may be provided with simple means.

The slight indentation in the permanent head 2 acts as a pilot hole for guiding a drill bit when the "permanent" bolt is to be removed at a later point.

Instead of a circular periphery, the hole 4 may be formed with a profile which allows a tool to engage the head 3 from the inside. For instance, a hexagonal outline for an Allen wrench, or a cross-shaped or star-shaped indentation for engagement by a Philips or a flat head screwdriver are envisioned.

The permanent head 2 is tapered so as to prevent the permanent bolt from being tampered with or removed with pliers or the like. Other, non-illustrated, configurations are possible for the head 2, such as counter-sinking. The top surface of the head 2 is slightly tapered towards the pilot hole 5. The result is that the remaining burr from the sheared-off torque head 3 lies below the uppermost level of the permanent head 2, thus preventing scratching and the like. The pilot hole 5 into the head 2 is so shallow as to not allow hard pointed objects to be forced into the head and allow the bolt to be removed.

The bolt shaft 1 may take different diameters and lengths, depending on a specific job requirement. The thread may be a left-hand thread or a right-hand thread. This adds further confusion, which increases the tamper resistance of the novel bolt. In a single mold, of course, all of the bolts have the same thread incline.

The bolt shaft 1 is formed with a hexagonal hole 6 at its end facing away from the permanent head. The hole 6 may be molded or machined into the shaft 1. An essential feature of the invention resides in the solid configuration of the shaft 1 from the head inwardly towards the hole 6. In other words, the hexagonal hole 6 is hidden from unauthorized persons. Should it be necessary to remove the bolt, it is further necessary to drill from the permanent head 2 through the shaft 1 to the hexagonal head 6. Once the hole 6 is exposed, the bolt may be removed with an Allen wrench.

The hole 6 may take various configurations. Its diameter is not crucial. It is understood, however, that the diameter must be chosen within the constraints of the other dimensions of the bolt. It is preferable when the diameter of the hole 5 is larger than that of the hole 6. The length of the hole 6 must be chosen such that enough torque may be applied which allows the bolt to be removed without stripping the inner profile.

The novel bolt is utilized as follows:

The complete unit is threaded into a threaded hole until it is fully inserted. Then the head 3 is engaged with a wrench, pliers, or the like, and the head 3 is rotated and the bolt is tightened further. When the upper limit torque is reached, the torque head 3 is sheared off from the permanent head 2 at the weakest portion of the bridge 4. At this point, the bolt cannot be removed with basic tools.

When it is necessary to remove the bolt, then the solid portion of the shaft 1 between the indentation 5 and the opening 6 must be removed. One will thereby use a drill bit which conforms with the diameter of the hole 5 (larger than the opening 6). Once the solid portion is drilled, the hexagonal profile of the opening 6 is exposed and the bolt can be removed with an Allen wrench or the like.

The narrowest portion of the bridge 4 defines the limit torque of the assembly. The diameter G is preferably chosen between 50% and 55% of the smallest diameter of the head 2 (its top surface). If the diameter G were less than 50% then the torque head 3 could more easily wobble sideways. As noted in the introduction, this would lead to increased susceptibility to side shear. In other words, the diameter G further defines the stability of the torque head 3 on the permanent head 2 (much like the wheel spacing in an automobile).

Sizes larger than about 60% would result in hole 5 having to be formed larger in order to attain the correct limit torque. The drill bit used to drill down into the shaft 1 would then likely be chosen so large as to endanger drilling into the thread at the outer circumference of the shaft 1.

According to the invention, the width G can remain constant and the diameter of the hole 5 can be varied depending on the desired limit torque.

The assembly may be manufactured from metals such as steel or aluminum. The preferred embodiment of the invention, however, is a molded engineering plastic. Plastics provide ease of manufacture due to their versatility and durability as compared to ferrous or non-ferrous inorganic materials. The person of skill in the pertinent art will chose a suitable material from the wide array of available alloys and plastic mixtures or compounds. All commercially available materials come attached with a detail spec sheet which allows proper selection of a suitable material.

Currently preferred plastics are polycarbonate, polyamide, polyurethane, and polyethyleneterapthalate (PET) in any of the available injection molding grades. It is further within the level of skill in the art to add any type of reinforcing additives such as glass or other fibers which add to product strength. In that regard, general fiber alignment parallel to the longitudinal axis of the assembly is preferred, because such fibers reinforce in the vertical direction (prevent skew wobble and premature breakage).

Figure 3:
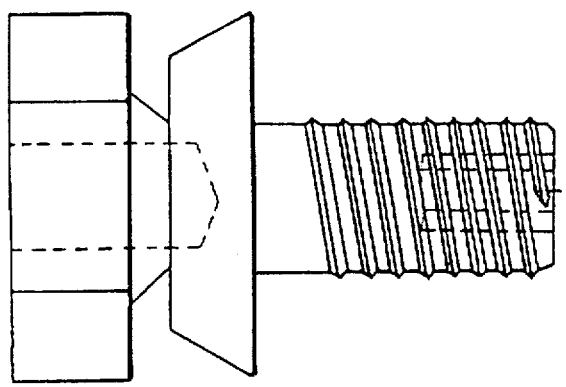
Figure 2:
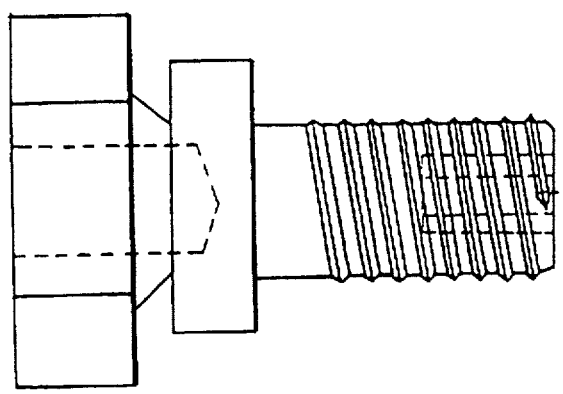
Figure 5:
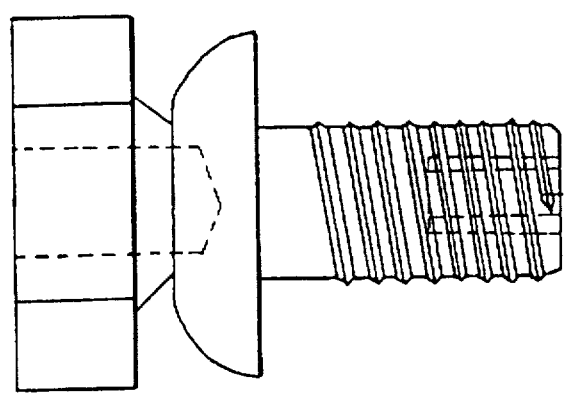
Figure 10:
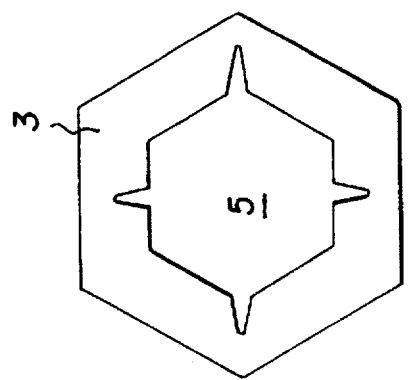
FIG. 10 is a top plan view of an alternative embodiment.

Various embodiments of the inventive concept are illustrated in FIGS. 2–10. FIG. 2, for instance, shows the permanent head 2 with a non-tapered outer circumference. The permanent head 2 of FIG. 3 is tapered towards the torque head 3. The upper surface of the permanent head 3 at which the bridge 7 is attached, is inwardly tapered towards the bolt axis. The permanent head 2 of FIG. 5 is dome-shaped.

Figure 7:
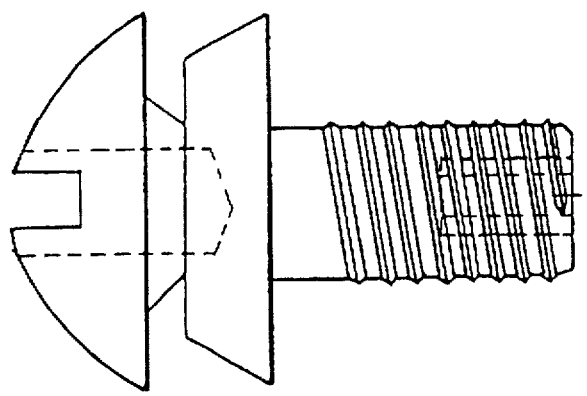
Figure 6:
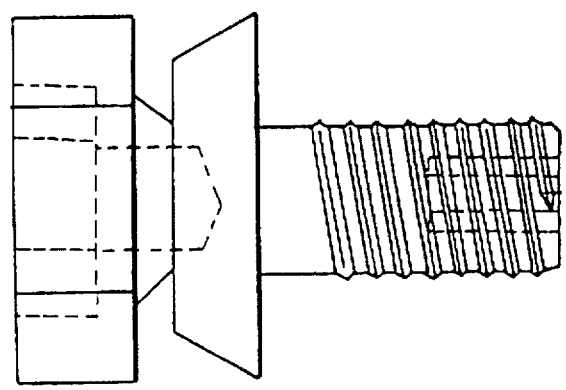
Figure 9:
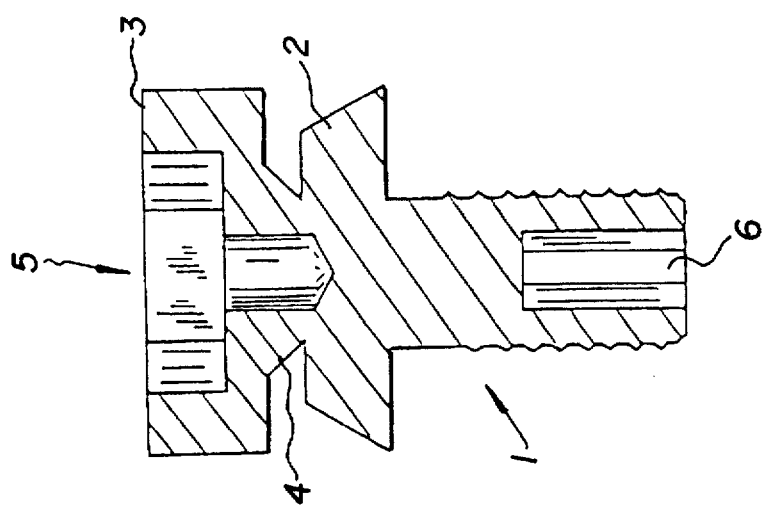
FIG. 9 is a longitudinal section through the bolt.
Figure 8:
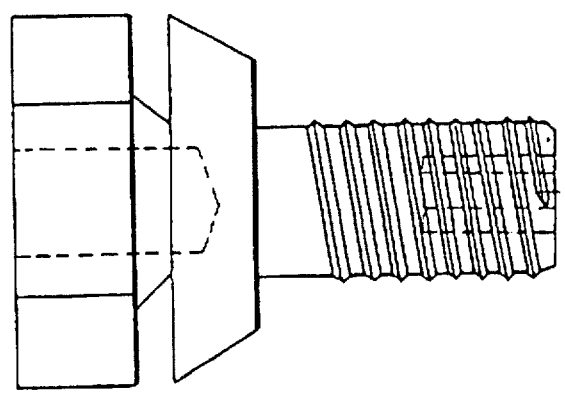

The torque head 3 of FIG. 6 has a large hexagonal inner profile. The torque head 3 of FIG. 7 is provided with a slot for engagement with a screwdriver. FIG. 8 illustrates the counter-sunk embodiment of the permanent head, i.e. the head 2 is tapered away from the torque head 3. The illustration of FIG. 9 is a sectional view showing two hexagonal profiles of the hole 5 and the opening 6 for engagement with Allen wrenches. Finally, the upper surface of the torque head is provided with an alternative profile for engagement with an Allen wrench or with a screwdriver.

It is noted that all of the foregoing variations of the inventive concept may be interchanged. Many different combinations are possible.

The product is preferably injection molded. The mold is a multi-cavity mold with mechanically operated cores.

The novel bolt described herein has many applications. Car stereos, call boxes, exterior cameras, airbags, doors and the like in public restrooms, road signs, and similar applications come to mind. A most suitable application is the attachment of registration tags on motor vehicles. In that case, the size of the lock screw is the same as typical screws as they are currently used.

Figure 11C:
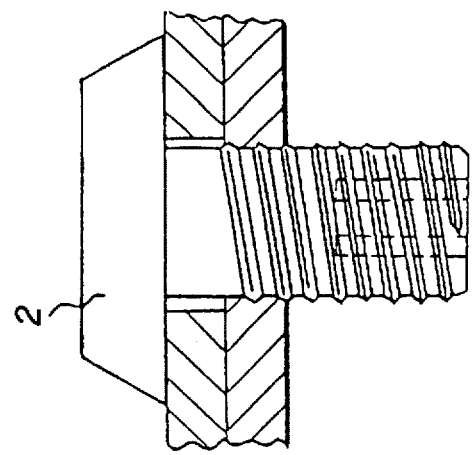
FIGS. 11A–11C are partly sectional, side elevational views showing a bolt attachment sequence.
Figure 11B:
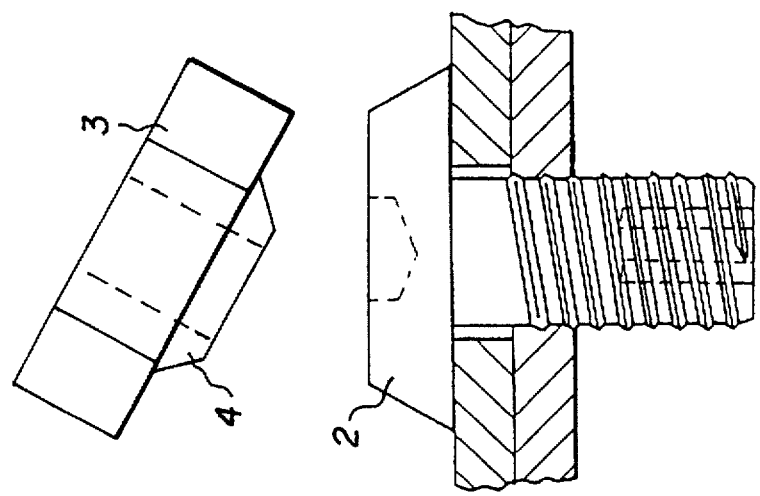
Figure 11A:
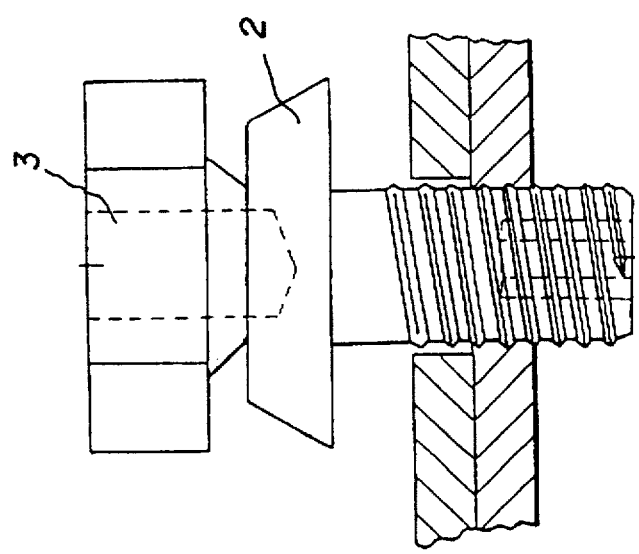
Figure 12C:
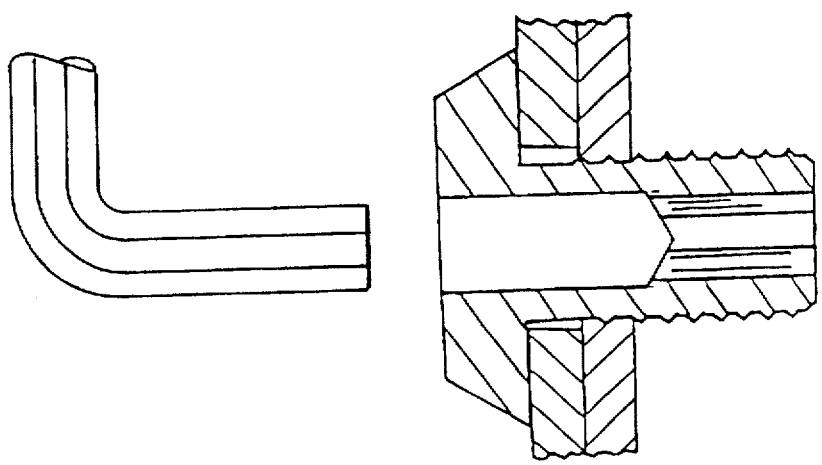
FIGS. 12A–12C are similar views showing a bolt removal sequence.
Figure 12B:
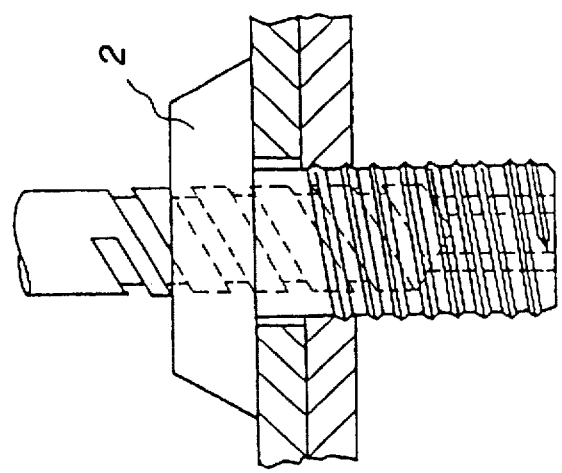
Figure 12A:
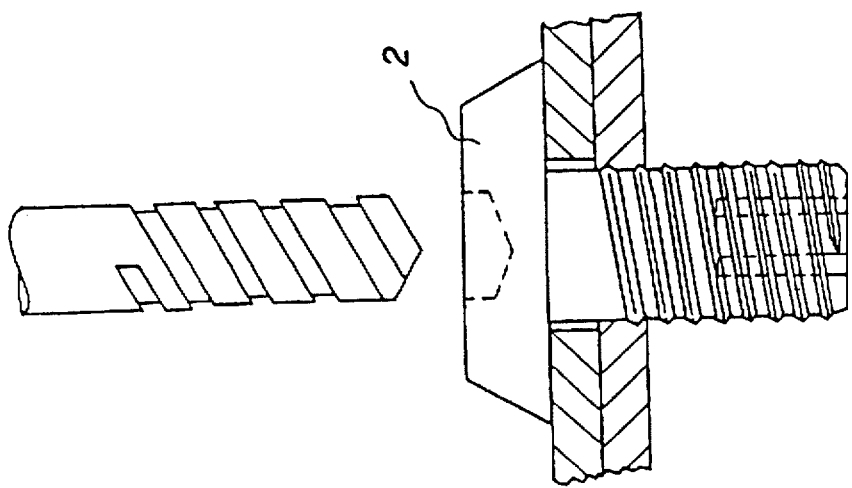

Referring now to the sequential views of FIGS. 11A–11C and 12A–12C, which illustrate the fastening of the bolt and the removal thereof, respectively, the bolt is first tightened with a wrench or the like. After the bolt is properly seated, the torque head 3 is sheared off by exceeding the rated shear torque limit. The bolt is now essentially not removable (FIG. 11C).

Should it be necessary to remove the bolt, then the indentation in the permanent head (the extension of the hole 5) is extended by drilling into the shaft until the opening 6 is reached. At this point, the hexagonal profile of the opening 6 is accessible, and the remaining bolt can be removed with an Allen wrench.

I claim:

1. A tamper-proof bolt, comprising:
   a threaded shaft with a first end and a second end, said shaft defining a longitudinal bolt axis;
   a permanent clamping head formed on said first end of said threaded shaft;
   said threaded shaft having a blind opening formed therein at said second end thereof, said opening extending along said axis and being formed with a profile for engagement with a torque tool; and
   a torque head formed on said permanent clamping head, said torque head having a hole formed therein, said hole extending through said entire torque head and partially into said permanent clamping head coaxially with said threaded shaft and with said opening in said second end of said shaft;
   said torque head being attached to said permanent head by the intermediary of a bridge defined around said hole in said torque head.

2. The bolt according to claim 1, wherein said torque head has a circumferential outer profile for engagement by a torque tool.

3. The bolt according to claim 2, wherein said circumferential outer profile is a hexagonal profile for engagement with a wrench.

4. The bolt according to claim 1, wherein said torque head is formed with an inner profile coaxially surrounding said hole for engagement by a torque tool.

5. The bolt according to claim 4, wherein said inner profile of said torque head is a hexagonal profile for engagement by an Allen wrench.

6. The bolt according to claim 1, wherein said profile of said opening is a hexagonal profile for engagement by an Allen wrench.

7. The bolt according to claim 1, wherein said permanent head has an outer circumference which is tapered towards said torque head.

8. The bolt according to claim 1, wherein said permanent head has an outer circumference which is tapered away from said torque head.

9. The bolt according to claim 1, wherein said permanent head has a surface at which said bridge is attached, said surface being inwardly tapered towards said bridge.

10. The bolt according to claim 1, wherein said permanent head has a surface at which said bridge is attached, said surface having a given diameter, and said bridge having a diameter between 50% and 60% of said given diameter.

11. The bolt according to claim 10, wherein said hole formed in said torque head has a diameter between 25% and 45% of the diameter of said bridge.

12. The bolt according to claim 1, wherein said shaft, said permanent head, and said torque head are integrally molded in one piece.

13. The bolt according to claim 12, wherein the bolt is injection molded.

* * * * *